United States Patent Office 3,589,998
Patented June 29, 1971

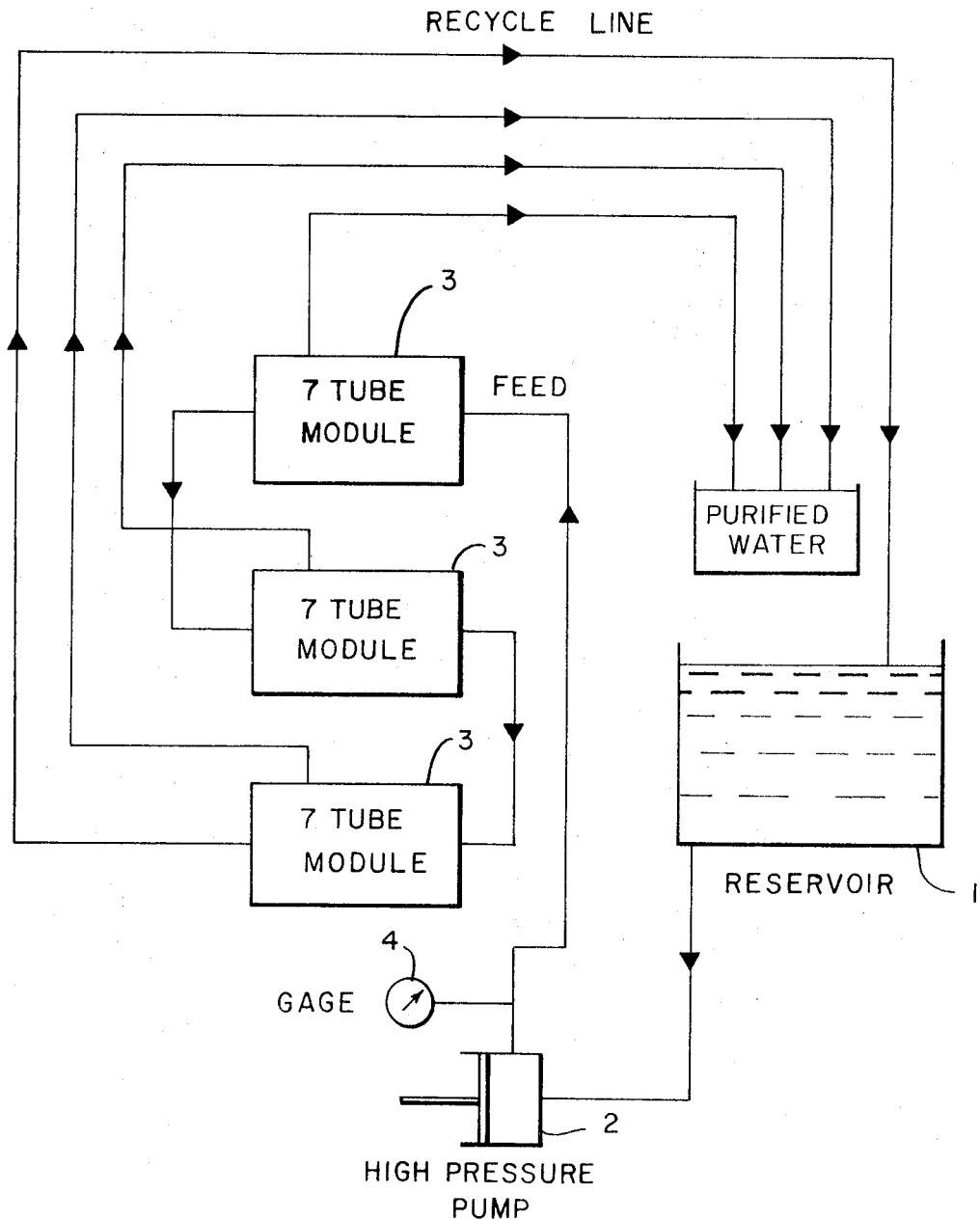

---

3,589,998
PROCESS FOR INHIBITING SCALE FORMATION ON THE SURFACE OF MEMBRANES IN REVERSE OSMOSIS APPARATUSES
Herbert L. Rice, Fort Worth, and Arthur Cizek and Marvin O. Thaemar, Houston, Tex., assignors to Milchem Incorporated, Houston, Tex.
Continuation-in-part of application Ser. No. 851,085, Aug. 18, 1969. This application May 8, 1970, Ser. No. 35,816
Int. Cl. B01d 13/00
U.S. Cl. 210—23                                    12 Claims

ABSTRACT OF THE DISCLOSURE

This invention relates to a process for inhibiting scale formation on the surface of membranes in reverse osmosis apparatuses. The process utilizes as an additive to the water prior to its passage through the apparatus an acrylic composition formed from about 80 to 90 parts by weight polyacrylic acid, about 7 to 15 parts by weight thioglycolic acid, and about 1.5 to 5 parts by weight ammonium persulfate.

---

CROSS-REFERENCE TO RELATED APPLICATIONS

This application is a continuation-in-part of our copending application Ser. No. 851,085.

BACKGROUND OF THE INVENTION

(1) Field of the invention

This invention relates to a process for the inhibition of scale formation on membrane surfaces of reverse osmosis water treatment apparatuses by utilizing a composition the starting materials of which are acrylic acid, ammonium persulfate, and thioglycolic acid. The treating composition is formed by reacting the starting materials in a one or multistage process. It is the discovery of this invention that the composition so produced effectively prevents the crystallization upon the membrane elements of hard water ions in calcium, magnesium, barium and similar scaling environments.

(2) Description of the prior art

The reverse osmosis process involves the separation of water and salt under pressure by means of a semipermeable membrane. The saline feed water is passed over the membrane at a differential pressure across the membrane exceeding the osmotic pressure of the feed, with the result that the permeate (product stream passing through the membrane) is depleted in salt, and the feed or brine affluent on the high pressure side of the membrane is enriched in salt. On the low pressure side of the membrane the permeate is collected. Its purity will depend upon operating factors which are not a part of this invention. A key requirement of the process is that the membrane effect a "decoupling" of the water and salt flows as compared to that of the saline feed. Investigation has shown that there are limitations in efficient use of reverse osmotic processes now known to the art. Primarily, these limitations involve clogging of the membrane by salt or scale deposition. This problem of fouling or clogging the membrane surface is not a minor one. In many instances clogged membranes will produce a reduced flux rate which drastically interferes with the commercial efficiency of the operation. It is not unusual for scale to so clog and foul membranes that the flux rate soon reaches near zero. Fouling and clogging of the membrane by scale accumulation will normally entail frequent and time-consuming shut-downs for cleaning purposes. This procedure requires disassembly of the apparatus, removal of the membranes, cleaning of the membranes, replacement, reassembly of the apparatus, and reactivation of the treatment process. Valuable production time is lost during the shut down period. In many instances, particularly when unusually fine membranes are utilized, the clogging becomes so critical that cleaning of the membrane is entirely unsuccessful. Reuse of the membrane becomes impossible, thus requiring actual replacement of the membrane from time to time, a step which is not only costly but likewise necessitates a shut down period and disassembly of the apparatus. This problem is further complicated in many instances by actual geographical location of the treatment unit, i.e., offshore drilling rigs, ships, islands, deserts and other places where water for drinking purposes cannot be transported and stored but must be obtained by purification of brine, sea water, etc. In these instances space and time are at a premium, and efficient operation without frequent shut downs becomes a necessity.

The prior art has taught several methods of treating scale occurring in reverse osmosis processses. For example, high molecular weight, low water solubility, polyelectrolytes have been utilized as a dispersant of the salts forming a thin layer along the surface of the permeable substrate which provides a dynamic membrane which will reject the solute in the feed water. These dispersants have aided in water purification processes but the formation of a scale rejecting membrane on the substrate results in reduced treatment rates which has restricted the use of such dispersants. Moreover, the dispersing characteristics of these materials results in dispersed scale but fails to inhibit scale formation. Other methods make no effort to prevent scale formation but rely upon frequent shut downs for in situ formation of a new membrane on the permeable substrate by small particles in the colloidal range up to 200 microns. These particles form a filter cake which is held together by the high pressure differential of the opposite surface of the membrane. Upon accumulation of scale the unit pressure is released and the filter cake disintegrates.

It is recognized that the prior art has taught the use of acrylamide polymers and copolymers for scale treatment in evaporators, cooling towers, reverse osmosis processes, and the like. However, these materials, all of relatively high molecular weight, are less water soluble than the product of the present invention and are relatively ineffective in actual inhibition of scale formation. These materials fail to inhibit scale formation build-up for the necessary run time needed in order to have a commercially acceptable operation.

In our copending application Ser. No. 851,085, we disclosed an acrylic composition for preventing normal hard water scale formation on scale attracting surfaces of heat transfer vessels. We have found that this acrylic composition also has unexpected utility in water treatment processes which do not rely upon heat transfer as the purification mechanism. We have discovered that scale formation on the membrane can be greatly reduced by utilizing a particular polyacrylic composition so as to achieve commercially acceptable continuous operation without the necessity for frequent shut downs to clean or replace the membranes. Although the mechanism is not fully understood, it is believed that our product is not a dispersant nor does it provide an in situ polyelectrolyte membrane on the membrane surface.

It is an object of this invention to provide a process to inhibit the formation of hard water scale on membrane surfaces of reverse osmosis apparatuses.

It is a further object of this invention to provide a process for inhibiting the deposition of hard water scale formation on membrane surfaces of reverse osmosis processes used to purify water for human consumption by utilizing an acrylic composition at relatively low p.p.m. levels.

Other objects and advantages of this invention will be apparent from the attached drawing and description, examples, and claims that follow.

SUMMARY OF THE INVENTION

The present invention has for its purpose the reduction of shut down time necessitated by the fouling and clogging of membrane surfaces by scale accumulation in reverse osmosis units. This purpose is achieved by a process utilizing an acrylic composition, heretofore unavailable, formed from about 80 to 90 parts by weight acrylic acid, about 7 to 15 parts by weight thioglycolic acid, and about 1.5 to 5 parts by weight ammonium persulfate.

DESCRIPTION OF THE ATTACHED DRAWING

The single drawing is a flowsheet of a reverse osmosis unit.

DESCRIPTION OF THE PREFERRED EMBODIMENTS

Reverse osmosis differs from other desalination processes in that the hydraulic pressure applied to the saline water provides the driving force for separation of pure water from the salts thus not requiring the use of heat exchange mechanisms. All solutions remain at ambient temperatures and there is no phase change. No heat or electrical current is added to the saline water as in distillation and electrodialysis, respectively. The heart of the process is the membrane which sustains the pressure gradient necessary for reverse osmosis to take place. As previously discussed, a problem area has been the clogging of the membrane surfaces by scale formation.

In our tests we have utilized tubular membrane systems having relatively large free passageways in which optimum velocities can be maintained. The wide variety of applications include saline water conversion, food industry applications, and industrial waste processing, including processing of pulp and paper waste streams.

FIG. 1 is a schematic diagram of a reverse osmosis unit. It consists of a small stainless steel holding tank 1 of about 12 gallons capacity; a reciprocating-type high pressure pump 2 with variable capacity of 0.3 to 3 gal./min. (20–200 cm.$^3$/sec.) and a maximum operating pressure of about 1100 p.s.i.; three 7-tube modules 3 connected in series each with a membrane area of 6.6' x 2'; a pressure gauge 4 with a pressure regulator and temperature control equipment. Operation is on a recycle basis with separate return lines for the individual modules, which is particularly important when modules are used with different types of membranes.

In the tests utilizing the acrylic composition the runs were performed at 450 p.s.i. for 6 hours at 25° C. The membranes were of the 3A cellulose acetate type. The reverse osmosis apparatus which was used in the examples below was a General Dynamics' Mark 11 pump unit equipped with a 9.5 inch fiberglass module. A pressure between 400–450 p.s.i. was utilized to maintain an objective feed flow rate of 800 ml./min.

The acrylic composition produced by reacting acrylic acid, thioglycolic acid, and ammonium persulfate is complex in nature. The claimed composition is produced by a combination of the processes of polymerization, telomerization, oligomerization, isomerization, condensation, and free radical fragmentation effects. Thioglycolic acid itself acts as a chain transfer agent in polymerization. In addition, it undergoes a variety of chemical reactions as a reducing agent, especially as employed in the present invention. Its oxidized fragments are capable of reacting with acrylic acid and/or free radical fragments produced in the system by the rapid reactions that are obtained. A small amount of esterification of the thiol moiety of thioglycolic acid has been observed.

The method for obtaining the acrylic composition utilizes the simultaneous reaction of an acrylic acid in the presence of thioglycolic acid and ammonium persulfate at temperatures ranging from about room temperature to about 80° C. The reaction is exothermic and is normally conducted in a solution. It has been found that any solvent or solvent system may be used which will dissolve the reactants without reacting in any substantial amount with the reactants or with the acrylic composition. For example, water, ethylene glycol and dimethylformamide have been used as solvents in the production of the acrylic composition. An aqueous solvent system is presently preferred for economy and convenience.

Upon initiation of the reaction by temperature or mutation catalyst, the quantities of thioglycolic acid and ammonium persulfate employed in the process react instantly with one another and with acrylic acid, causing an exotherm to occur. The reaction occurring among the ingredients is complete within one to five minutes as measured by lack of volatile matter in determining the total solids content on a sample of product using a moisture balance or a vacuum oven at 100° C. with a 25-inch vacuum. Oxygen dissolved in the aqueous reaction medium, or other solvent medium, need not be removed by purging the system by nitrogen or by other means.

The presently preferred starting material is any grade of commercially available glacial acrylic acid. Acrylic acid containing 200 parts per million of methylether of hydroquinone inhibitor may be used and it is preferred that higher concentrations of inhibitor not be used, but the amount of inhibitor in the acrylic acid is not critical. The amount of acrylic acid to be reacted in a single reaction stage to produce the acrylic composition may range from about 5% to about 30% by weight of the total solvent system (including reactants). The actual amount depends on the cooling process available for control of the reaction exotherm. If no cooling is available, it is preferable to react 5% to 10% of acrylic acid by weight of the total solvent system. If cooling water is available, somewhat more acrylic acid may be reacted. If refrigerated cooling is available, amounts of acrylic acid from 25% to 30% by weight of the solvent system may be reacted successfully. By incremental additions of any desired number of aliquot portions of the reactants whereby each successive addition made after the preceding incremental addition has completed its reaction, a relatively higher proportion of reactants to solvent may be used without difficulty in controlling the temperature. The amount of solvent used for either single stage or multistage reactions is not critical, but will normally be above about 330 parts by weight for 100 parts acrylic acid used. If desired, much higher amounts of solvent may be used, but as more solvent is used the solids content of the acrylic composition (including solvent) will be reduced. Normally, a high solids liquid product is desired.

The amounts of thioglycolic acid and ammonium persulfate to be reacted are conveniently determined by the charge weight or amount of acrylic acid used. An amount of thioglycolic acid obtained as a 98% pure vacuum distilled material may be used in an amount ranging from about 10% to about 15% by weight of the acrylic acid. However, about 12% by weight thioglycolic acid based upon the weight of acrylic acid is presently preferred.

The ammonium persulfate used in the preparation of the acrylic composition is preferably a commercially available technical grade of ammonium persulfate. About 2% to 5% by weight ammonium persulfate based upon the weight of acrylic acid may be used, and about 4% of this reactant is preferred. Preferred acrylic compositions have been prepared by utilizing all of the ammonium persulfate at the onset of the reaction. However, it has been found that incremental additions of this reactant with each charge of acrylic acid are equally effective.

The method for making the scale inhibiting composition utilized in our process involves an oxidation-reduction (redox) reaction which may require catalytic initiation. If the reaction process is to be conducted at room temperature, the use of from about 5 p.p.m. to about 30 p.p.m. of a catalytic ion, such as ferric, ferrous, or cupric, will be required. If starting temperatures of 50° C. or more are used, enough energy is present in the system to activate the reaction without recourse to the use of a catalytic ion. Ammonium persulfate will generally serve as the initiator at high temperatures. It has been found that if either ammonium persulfate or thioglycolic acid is absent, or is not present in the amounts specified regardless of whether an amount of catalytic ion is present at any temperatures, the acrylic composition will not be produced.

If the solids content of the above described acrylic composition is low because, for instance, natural atmospheric cooling or cooling water were employed with a low starting concentration of acrylic acid, then the solids content may be raised to an economical level by boiling the solution to remove water, or by a flash condensation or evaporation process. As previously noted, any non-reactive solvent may be used, but it is presently preferred to utilize the entire acrylic composition as an aqueous inert solvent system. A fresh charge of acrylic acid, thioglycolic acid, and ammonium persulfate is weighed into the system in the preferred amounts used to prepare the initial low solids acrylic composition, and the reaction is carried out exactly as above described. This type of staging process may be repeated again with the addition of another charge of reactants, or successive charges may be added until the acrylic composition solids level is raised as high as 35% to 40% of the total system.

The acrylic composition of this invention prepared by the reaction described herein is effectively utilized for scale prevention in reverse osmosis processes. This aqueous acidic composition is a relatively nonviscous Newtonian fluid which dissolves in surprisingly high concentrations of electrolytes. It has been found that practical (2% by weight) concentrations of this acrylic composition are soluble in sodium chloride and calcium chloride brine of over 20% activity by weight. If desired, the solvent may be evaporated to produce an amorphous, glass-like brittle solid which can be reduced to a powder. The solid is readily soluble in water. A neutralized form of the acrylic composition is presently preferred to avoid problems of handling the corrosive acid form. Solvent may also be removed from this product to obtain a dry powder.

The composition utilized in our process is the reaction product of about 80 to 90 parts by weight acrylic acid; about 7 to 15 parts thioglycolic acid and about 1.5 to 5 parts ammonium persulfate. The preferred acrylic composition is the reaction product of about 86 parts by weight acrylic acid; 10.5 parts by weight thioglycolic acid; and 3.5 parts by weight ammonium persulfate. Preparations of the acrylic composition of this invention have been found to have a number average molecular weight in the range 500 to 1000. Molecular weight was determined using a Hitachi Perkin-Elmer Model 115 vapor pressure osmometer. A sample of acrylic composition is evaporated to dryness and dissolved in N,N-dimethylformamide, then filtered to remove inorganic residuals. This solution is made to a known concentration. The imbalance of two thermistors is measured across a pair of thermistor beads calibrated on a series of varying concentrations of benzil (MW 210) in the same solvent at main oven setting of 55° C., and sub-oven setting of 50° C. Typically, this acrylic composition at a level of 25% to 30% solids by weight will have a pH of about 2 and a viscosity ranging from about 6 cp. to about 12 cp. As used herein, viscosities are usually determined at 25° C. or 30° C. using a Fann viscometer rotating at 300 r.p.m. The measurement depends on torque forces supplied to a stationary suspended cylinder within a larger concentric cylinder shearing a liquid in contact with both cylinders at a given shear rate. For the reason that a viscosity value loses significance as an indication of molecular weight in the molecular weight range of 500 to 1000, it is deemed preferable to designate the acrylic composition as a polyfunctional electrolyte or as a low molecular weight polyelectrolyte of complex chemical character. In fact, if the acidity of this acrylic composition is neutralized to at least 70% based on acrylic content and the resulting solution is diluted to 6.5% solids, a measurement of only 1.16 centistokes is obtained at 30° C. on a Fann viscometer. This value is not much greater than a solution of ordinary electrolyte in water would have, or of water alone.

The acrylic composition produced by the process described herein is acidic and begins to precipitate a complex low molecular weight sulfur bearing fraction due to crystallization when the acidic solution ages for several days at room temperature. To avoid this and to render the acidic acrylic composition less corrosive for practical use purposes, it is preferred that the acidity of the composition be neutralized. This procedure in no way detracts from the scale inhibiting performance of the material. Convenient alkaline materials suitable for the neutralization procedure include, by way of examples, sodium, potassium, or ammonium hydroxide, and mono, di, or tri alkanolamines, various bases and other compatible basic chemicals.

In the use of this acrylic composition for the control of scale formation in reverse osmosis processes, the precise amount of the agent required for inhibition of scale will vary depending on the quantity and nature of the solids contained in the system to be treated. Without limiting the generality of the foregoing, it has been observed that the quantity of the acrylic composition for scale inhibition can usually require from about 5 to 10 p.p.m. However, the amount needed will vary depending on factors such as scale quantity and quality, membrane surfaces, pressure and the like. Initial testing by sampling in a laboratory apparatus should be conducted to determine the desired quantity of acrylic composition needed to make the process commercially and economically acceptable.

Seawater and brines contain many salt or scale-producing substances which will contain forms of calcium, magnesium and similar ions. These substances will become affixed to the membrane surfaces of reverse osmosis units used to transpose seawater or brines into purified water for human consumption. Production of pure water is greatly reduced as the scale deposit increases, thus causing less efficient desalination and the requirement of increased pressure used to obtain continuous high desalination production which eventually results in pressure destruction of the membranes. The acrylic composition, especially the sodium salt, has been found to be an excellent scale inhibitor when placed into the water used in these units.

PREPARATION OF THE COMPOSITION

An acrylic composition was made by first placing 537 grams of deionized water into a reaction vessel, which was stirred continuously and heated to a temperature of over 75° C. A charge of 75 grams of an aqueous solution of 90.9% acrylic acid was then placed into the vessel. This charge was followed by an 8.2-gram charge of thioglycolic acid. One-half minute after the addition of the thioglycolic acid, a 5.8-gram addition of an aqueous 33.3% ammonium persulfate solution was placed into the vessel. This addition caused an immediate exotherm, raising the reactant temperature to over 90° C. A 1.9-gram addition of an aqueous 33.3% ammonium persulfate solution was then placed into the vessel. The vessel contents were allowed to cool to 70° C. After sufficient cooling, the second of the three 75-gram charges of an aqueous 90% acrylic solution was placed into the vessel, resulting in a temperature decrease to 65° C. Another 8.2-gram thioglycolic acid charge was made which was followed one-half minute later by a charge of 5.8 grams of an aqueous 33.3% ammonium persulfate solution. An exothermic reaction occurred which caused an increased temperature to about 83° C. Before cooling commenced, a 1.9-gram charge of the aqueous 33.3% ammonium persulfate solution was added. The vessel contents were allowed to cool to a temperature of about 70° C. A final 75-gram charge of an aqueous 90.9% acrylic acid solution was placed into the vessel, which lowered the temperature to 65° C. A final addition of 8.2 grams of thioglycolic acid was added to the vessel contents followed 30 seconds later by 5.8 grams of an aqueous solution of 33.3% ammonium persulfate, resulting in an exothermic reaction and a temperature of about 80° C. A final addition of 5.8 grams of an aqueous 33.3% ammonium persulfate solution was placed into the vessel. This acrylic composition had a sand-bath activity solids content of 28.7% and a viscosity of 7 cps. at 30° C. as determined by a Fann viscometer model 39A.

PREPARATION OF THE NEUTRALIZED COMPOSITION

Forty grams of a glacial acrylic acid (200 p.p.m. methyl ether of hydroquinone inhibitor) was added to 400 grams of deionized water in a beaker, and 0.2 cc. of a 6% solution of $FeCl_3$ was added to provide about 10 p.p.m. $Fe^{+++}$. Six grams of thioglycolic acid (Evans 98% vacuum distilled) was added to provide about 15% based on the acrylic acid charge weight. Eight grams of a 10% solution of ammonium persulfate was added to the beaker incrementally at room temperature to give an amount of ammonium persulfate equal to 2% based on the acrylic acid charge weight. A reaction exotherm of 19° C. was obtained over a five-minute period. The beaker was allowed to cool to room temperature. A fresh charge of acrylic acid in an amount of 8.8% of the weight of the beaker contents was then added, followed by another charge of thioglycolic acid equal to 15% of the weight of the incoming charge, and 2% of the ammonium persulfate based on the new acrylic charge was added. No more catalyst ion was needed. After cooling the beaker contents, the procedure was repeated again with 10% of acrylic acid based on the new beaker contents, and 15% thioglycolic acid and 2% ammonium persulfate based on the acrylic charge. The solids content of the acrylic composition was 26.5% by weight and the viscosity was less than 10 cp. The total charge weight was neutralized to a pH of 6.5 with 76 grams sodium hydroxide pellets. This neutralized composition then contained 30% total solids by weight and its viscosity was 29 cp. as measured at 23° C. at 300 r.p.m. on a Fann viscometer.

Example

A General Dynamics' Mark 11 pump unit equipped with a 9.5-inch by 0.5-inch fiberglass module with a type 3A cellulose acetate membrane was used to maintain a feed flow rate of 800 ml./min. at a pressure between 400 and 450 p.s.i. Water flux values were corrected to 25° C. as the temperature of the feed climbed to 34° C. during the runs. Reagent grade sulfate was used to produce the saturated solutions. A run ("A") was first made without utilization of the acrylic composition of the present invention. After one hour the flux rate began to fall from a high of 4.2 ml./min. to a low of 1.6 ml./min. after 6 hours. A second run ("B") was made using 5 p.p.m. of the acrylic composition of the present invention. The acrylic material was added to the reservoir treatment water. The acrylic composition effectively maintained flux rate above 3.0 ml./min., a satisfactory and economical flux rate for over 6 hours. The table below illustrates the results of these runs.

| Time (hours): | Run A, flux ml./min. 25° C. (no acrylic) | Run B, flux ml./min. 25° C. (acrylic added) |
|---|---|---|
| 1 | 4.2 | 4.4 |
| 5 | 2.3 | 3.1 |
| 6 | 1.6 | 3.1 |

Although certain preferred embodiments of the invention have been disclosed for purposes of illustration, it will be evident that various changes and modifications may be made therein without departing from the scope and spirit of the invention.

What we claim is:

1. In a process of inhibiting formation of scale-containing ions on the surface of membranes during the operation of reverse osmosis water treatment units utilizing said membranes, the step of adding to the input water a scale inhibiting amount of the composition comprising the product formed by the reaction of 80 to 90 parts by weight acrylic acid, about 7 to 15 parts by weight thioglycolic acid, and about 1.5 to 5 parts by weight ammonium persulfate.

2. The step of claim 1 wherein an addition of at least about 5 p.p.m. of said composition is added to the input water.

3. The step of claim 1 wherein the said composition is neutralized.

4. In a process of inhibiting formation of scale-containing ions, on the surface of membranes during the operation of reverse osmosis water treatment units utilizing said membranes, the step of adding to the input water a scale inhibiting amount of an acrylic composition formed by reacting in an aqueous solution (1) an acrylic acid of between about 5% and about 30% by weight of the total aqueous solution with (2) thioglycolic acid of between about 10% and about 15% by weight acrylic acid utilized and with (3) ammonium persulfate of between about 3% and about 5% of the acrylic acid used.

5. The step of claim 4 wherein an addition of at least about 5 p.p.m. of said composition is added to the input water.

6. The step of claim 4 wherein the said composition is neutralized.

7. In a process of inhibiting formation of scale-containing ions on the surface of membranes during the operation of reverse osmosis water treatment units utilizing said membranes, the step of adding to the input water a scale inhibiting amount of the composition comprising the product formed by the reaction of about 86 parts by weight acrylic acid, about 10.5 parts by weight thioglycolic acid, and about 3.5 parts by weight ammonium persulfate.

8. The step of claim 7 wherein an addition of at least about 5 p.p.m. of said composition is added to the input water.

9. The step of claim 7 wherein the said composition is neutralized.

10. In a process for purifying input water for human consumption utilizing a reverse osmosis apparatus having membranes, the step of adding to said input water to inhibit the formation of scale-containing ions on surfaces of said membranes the composition comprising the product formed by the reaction of 80 to 90 parts by weight acrylic acid, about 7 to 15 parts by weight thioglycolic acid, and about 1.5 to 5 parts ammonium persulfate.

11. The step of claim 10 wherein an addition of at least about 5 p.p.m. of said composition is added to the input water.

12. The step of claim 10 wherein the said composition is neutralized.

References Cited

UNITED STATES PATENTS

| 3,462,362 | 8/1969 | Kollsman | 210—23 |
| 3,492,240 | 1/1970 | Hettinger | 252—180 |

MICHAEL ROGERS, Primary Examiner

U.S. Cl. X.R.

210—58, 321; 252—180; 260—79, 89.5